INVENTORS
RENÉ A. HIGONNET
LOUIS M. MOYROUD
BY
ATTORNEYS

INVENTORS.
RENÉ A. HIGONNET
LOUIS M. MOYROUD
BY
ATTORNEYS

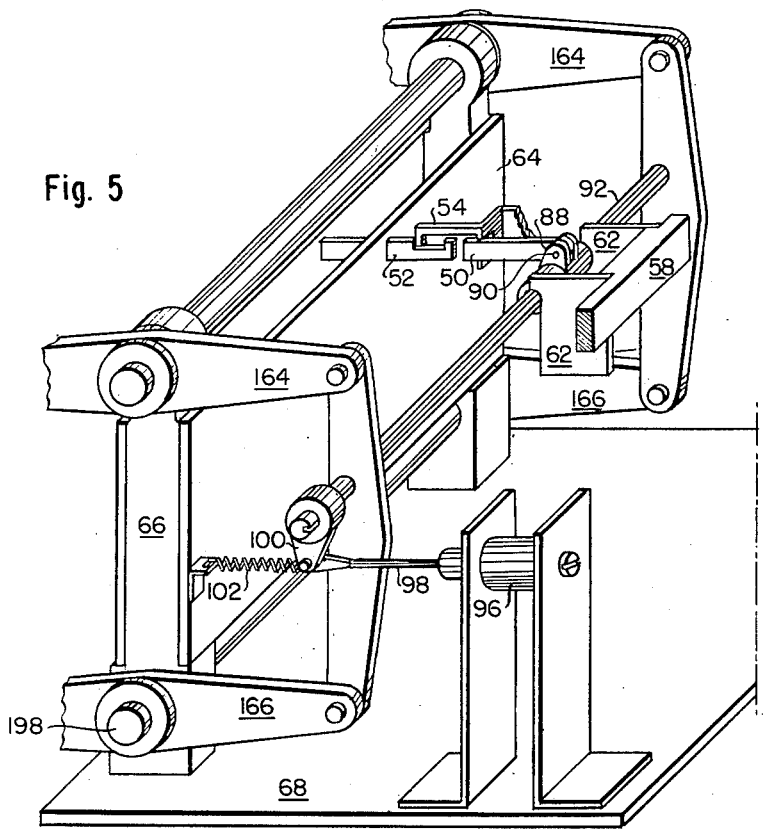
Fig. 5
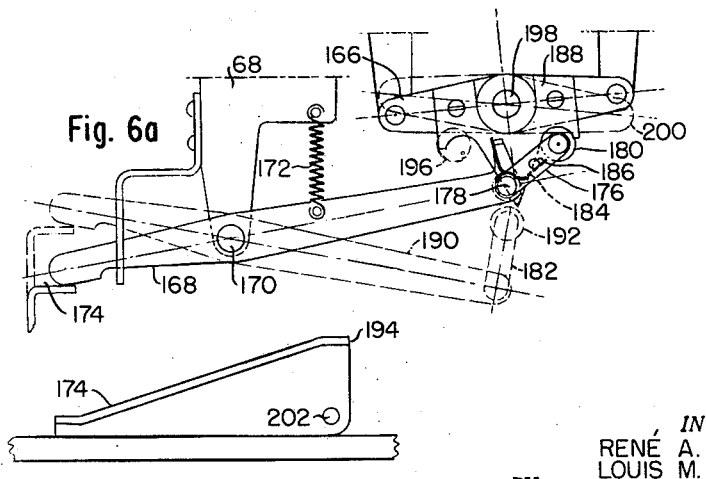
Fig. 6a
Fig. 6b
INVENTORS.
RENÉ A. HIGONNET
LOUIS M. MOYROUD
BY
ATTORNEYS

INVENTORS.
RENÉ A. HIGONNET
LOUIS M. MOYROUD
BY
ATTORNEYS

United States Patent Office 2,797,787
Patented July 2, 1957

---

2,797,787

TYPE COMPOSING APPARATUS

René A. Higonnet, Cambridge, and Louis M. Moyroud, West Medford, Mass., assignors to Graphic Arts Research Foundation, Inc., Cambridge, Mass., a corporation of Delaware Application January 12, 1954, Serial No. 403,584

Claims priority, application France January 16, 1948

7 Claims. (Cl. 197—19)

The present invention relates to type composing apparatus, and more particularly to apparatus utilized in conjunction with the storing of information relative to the selected characters to be composed, and for correcting said information prior to the composition of the characters in final form.

This application is a continuation-in-part of our copending application Serial No. 770,320, filed August 23, 1947, and contains divisional subject matter disclosed in our copending application Serial No. 70,472, filed January 12, 1949, now Patent No. 2,682,814.

The invention concerns a register or memory device including storage devices which are adapted to assume a number of stable conditions to represent selective keyboard operations, selector devices under the control of the keyboard for "writing," or altering the condition of the storage devices according to the keyboard operations, and reading devices adapted to detect the information so stored at some subsequent period, and to make it available to other units of the composing apparatus for "transcription," or production of justified lines of characters.

An important object of the invention is to provide with such a register provision for rapid and convenient erasure of stored information resulting from erroneous keyboard operations, such as misspelling or the like. Since the requirements or justification necessitate a delay between the writing of any particular information in the register and the reading and transcription thereof, it follows that the information stored in the register can be most conveniently corrected within the delay period, that is, before the reading devices transmit the information to the transcribing apparatus. Furthermore, since correction usually entails substitution of characters of different widths from those which were incorrectly stored, it also follows that appropriate correction provisions must be made for this difference prior to the computation of the justification increments for the line in which the correction appears.

Particularly in photographic type composing apparatus, it is desirable for the compositor to operate a non-justifying typewriter having adaptations of the keyboard suitable for actuation of both the register and the justification apparatus. Thus, the compositor is able to see the characters selected in complete lines, and he is then better able to determine whether correction is necessary.

Accordingly, a further object of the invention is to utilize the feature of a register having linkage with the non-justifying typewriter. This linkage may take the form of a mechanical connection between the platen of the non-justifying typewriter and the selector devices, whereby the selector devices are presented to successive groups of storage devices under the control of the same escapement mechanism which moves the platen of the non-justifying typewriter. This means that, while the selector devices are normally driven in one direction step-by-step as the line is composed, they may readily be returned to any desired position in order to permit the performance of the correction functions heretofore mentioned. Such a register is described in our above-mentioned copending application Serial No. 770,320 and also our copending application Serial No. 187,476, filed September 29, 1950, now Patent No. 2,690,249, which is a continuation-in-part thereof.

With the above and other objects in view, a feature of this invention is the provision of correction means based upon the utilization of a code in the storage of characters in the register. Thus, assuming for example that there are seven binary storage pins or similar devices for each character in the register, these devices will be divided into two groups, a "width selector" group of four devices which represents the width of the character in binary notation, and a "character selector" group of three devices, which distinguishes between characters of like width in addition to signaling other commands such as changes in size, set width, style, or case of the characters.

The correction procedure is similar to that described in our previously mentioned applications Serial Nos. 770,320 and 187,476, in that the operator returns the platen carriage of the non-justifying typewriter to the position wherein the erroneous character is typed, and depresses a "correction key" which ultimately retracts all the register pins corresponding to that position only, so as to permit the correct key to be depressed and stored in that position.

According to this invention, the depression of the "correction key" initiates a correction cycle as described in our copending application Serial No. 70,472. During this cycle, the "width selector" pins representing the erroneous character width are sensed and this value is subtracted from the line length adder, after which all of the pins are retracted as previously explained.

Other features of the invention will be more readily understood from the following description of a preferred embodiment thereof and from the accompanying drawings, in which Fig. 1 is a block diagram of a photographic composing machine incorporating the invention;

Fig. 5 is a partial pictorial view of the register showing the rocking elements to be operated for successive lines of type;

Figs. 6a and 6b are views showing additional details of the rocking mechanism;

Block diagram

Figure 1:
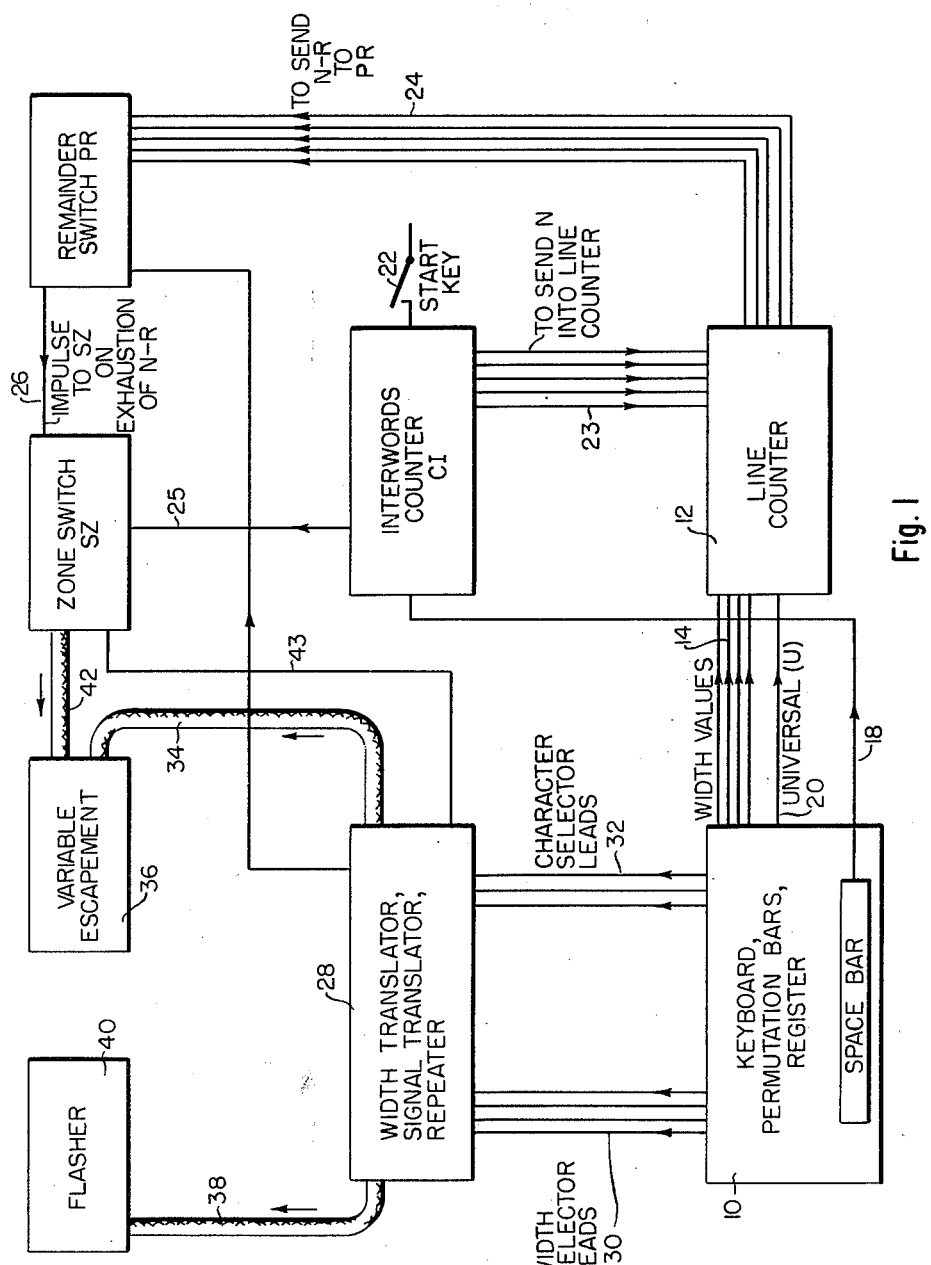

The invention will be described in connection with the block diagram of Fig. 1. The apparatus indicated in the block 10 at the lower left hand corner of Fig. 1, comprises the typewriter having a keyboard, the permutation bars actuated by the typewriter keys and the register for storing the coded information corresponding to the selection of a given character. As explained in our copending application Serial No. 770,320, the system preferably includes a register having two sets of pins whereby the coded information already stored on one set of pins may be decoded and transmitted to the flash unit and variable escapement while a subsequent line is being typed on the typewriter. In common with usual printing techniques various characters of the font are allocated arbitrary width-values. For example, in a repesentative font, the width values of i and l are 5 units; f and j, 6; a, g and numerals, 9; b, h, n and s, 10; T, F and L, 12; M, H and W, 15. An arbitrary minimum interword value is also assigned which, by way of example, will be taken as 4 units.

On each actuation of any character of the typewriter, the register is operated to store the required information. Also on each actuation of a character the width value thereof is transmitted to the line counter 12. For this purpose four leads 14 connect the block 10 with the block 12 in Fig. 1. It will be noted from the above that twelve different width values, ranging from the interword value (4 units) to W (15 units) are generally sufficient to cover all possible fonts. For this it suffices to have four leads 14 (because $2^4=16$), although if a greater number of width values are required, a larger number of leads may be used.

Each actuation of the space bar, in addition to adding 4 units to the line counter, adds one into the interword counter CI, whereby the line counter accumulates the number of width units from the beginning of the line and the interword counter accumulates the number of interwords. For this latter purpose, a connection 18 runs from a switch operated by the space bar of the typewriter to the interword counter CI.

In addition to the leads 14 connecting the permutation bars with the line counter, there is a lead 20 operated by a "universal" switch for purposes to be described later.

At the completion of the typing of a line, the line is read by the operator and if it appears correct the operator presses a manual start key 22, which initiates operation of the justifying mechanism and thereafter automatically starts the printing cycle. The justifying operation is as described in our said application Serial No. 70,472 and is not here explained in detail. In brief summary, it is as follows.

Let J represent the desired length of the line in the arbitrary units and let L be the total width of all of the characters and minimum interwords, as stored on the register. The line is too short by the deficit D so that $J-L=D$. The object of justification is to distribute among the interwords the deficit D so that the length of the line will be increased from L to exactly J.

Let N be the number of interwords; then the relation between the deficit D and the number N may be expressed as follows:

$$D = NQ + R \quad (1)$$

where Q is the integral value of the quotient of N into D, and R is the remainder. The justifier adds Q units to the first $N-R$ interwords, and $Q+1$ units to the last R interwords. The number of length units thus added is $$(N-R)Q + R(Q+1) = NQ + R = D \quad (2)$$

The operation may be described in conjunction with a numerical example. Let us suppose that D equals 41 (that is, the line is 41 units too short) and that the number of interwords N equals 12.

Into the line counter 12 we now introduce the number W successively. This is done through the five leads 23 connecting the interword counter 16 with the line counter 12. In the example chosen the deficit D is therefore successively reduced from 41 to 29, to 17, and to 5. At the fourth addition the capacity of the counter is exceeded (and in the example chosen it is exceeded by exactly 7 units). The number of times that N has been added into the counter to tip the counter over is then exactly $Q+1$. The amount by which the capacity is exceeded is $N-R$. We now write the general Equation 2 again, and under it we write the numerical values for this example as follows:

$$(N-R)Q + R(Q+1) = NQ + R = D$$
$$7 \times 3 + 5 \times 4 \quad = 12 \times 3 + 5 = 41$$

There is provided a remainder switch PR which is connected to the line counter 12 by a set of five leads 24. The counter, as heretofore noted, displays at this time the number 7 (or in general, $N-R$). This value of $N-R$ is transmitted over the leads 24 to be recorded in the remainder switch PR.

There is also provided a zone switch SZ connected with the interword counter by a lead 25. This zone switch is first caused to store the number Q which is to be applied to the first $N-R$ interwords; for this example the zone switch is set at the value 3 which is to be applied to the first 7 interwords. A lead 26 connects the remainder switch PR with the zone switch SZ and acts to send into SZ an impulse on exhaustion of the value of $N-R$ from the remainder switch PR. In other words, as the escapement of the film carriage operates, the remainder switch PR is caused to move one step nearer its home position for each interword. Upon arrival at its home position, which means that the first $N-R$ interwords have been increased by Q, the impulse from PR changes the zone switch from Q to $Q+1$, whereby the remaining R interwords are increased by $Q+1$. (In the example chosen, PR takes 7 steps to its home position, and then changes the zone switch from 3 to 4 units for the remaining 5 interwords.)

Referring again to the block diagram, there is provided a block indicated at 28 and designated width translator, signal translator and repeater. This block 28 is connected to the block 10 by two sets of leads, designated as a set of four width-selector leads 30 and a set of three character-selector leads 32. These leads are energized by the reading mechanism of the register. The four leads 30 serve to select the width of the character and to initiate correct operation of the variable escapement mechanism. The three leads 32 select the required characters from all characters having the same width. For example, b and h have the same width so that the leads 30 carry the same impulses therefor. However the leads 32 carry different impulses for these two characters.

From the width-translator 28 a cable of twelve leads 34 runs to the variable escapement mechanism 36. This is the variable escapement for the film carriage, which may be of the type described in our application Serial No. 770,320. The impulses on leads 30 and 32 are transmitted through a signal translator and repeater through seven leads 38 into the flasher unit 40 by which the selected character is illuminated at the proper time to throw its image on the photographic sheet as described in our copending application Serial No. 770,320.

The zone switch SZ is connected through seventeen leads 42 with the block 36. Whenever an interword is called for by the leads 30 and 32, the flasher is not operated but a signal is sent from the signal translator to the zone switch SZ over a lead 43. The width of the interword is determined by the setting of the zone switch, whereby a signal is transmitted into the variable escapement mechanism through one of the leads 42. In the example chosen the zone switch will signal the variable escapement mechanism for an increment of 3 units for the first seven interwords and an increment of 4 units for the last five interwords, whereby the actual spaces will be 7 units for the first seven interwords and 8 units for the last five interwords.

So far the mathematical principles on which the justification is based have been described as if the computations were carried out in the decimal system. The actual computations are, however, preferably carried out in the binary system. The structure of the various units and the mode of computation in the binary system will not be described in detail, since a full description appears in our application Serial No. 70,472.

Register

The preferred embodiment of the registering device is shown in Figs. 4 to 9. In this arrangement the combination of displaced pins representing a line of characters is set by a group of seven hammers following the displacements of the typewriter platen and travelling in front of a fixed frame provided with sliding pins. This device may be divided, for the sake of the description, into three main groups or sections designated by 44, 46 and 48 in the Figs. 8 and 9. Section 44 comprises the seven hammers 50, adapted to push from idle position into operative position a selection of flat pins 52 while a line is being type. This section includes also means for correcting erroneous settings, that is to say, means to erase a character, said means comprising, in group 44, hooked members 54, one for each hammer, and adapted to reset the seven pins of the vertical row opposite the seven hammers.

Correction feelers 56 are also provided for detecting the code arrangement of the pins before they are reset in order to subtract in the line counter a number of units corresponding to the width of the erased character as will be explained at length later.

The partial assembly 44 follows all the displacements of the typewriter platen to which it is directly and rigidly connected by the member 58. This sub-assembly follows the platen when a line is typed or when the operator displaces the typewriter platen for instance for a correction or tabulation work or when he depresses the "Back Spacing" key. This assembly has, near the frame bearing the sliding pins, an elongated opening 60 (Fig. 9) provided between two guides 62 rigidly secured to the member 58 and mounted thereon so that its axis is exactly opposite the axis of a vertical row of pins when the typewriter is at rest. When the platen escapes one tooth and moves one step the opening advances also one step and reaches a position opposite the next vertical row of pins. This opening is used to guide the hammers 50, feelers 56 and erasers 54. These various elements are slidably mounted in the opening, the width of which is preferably equal to half the pitch of the typewriter.

Figure 7:
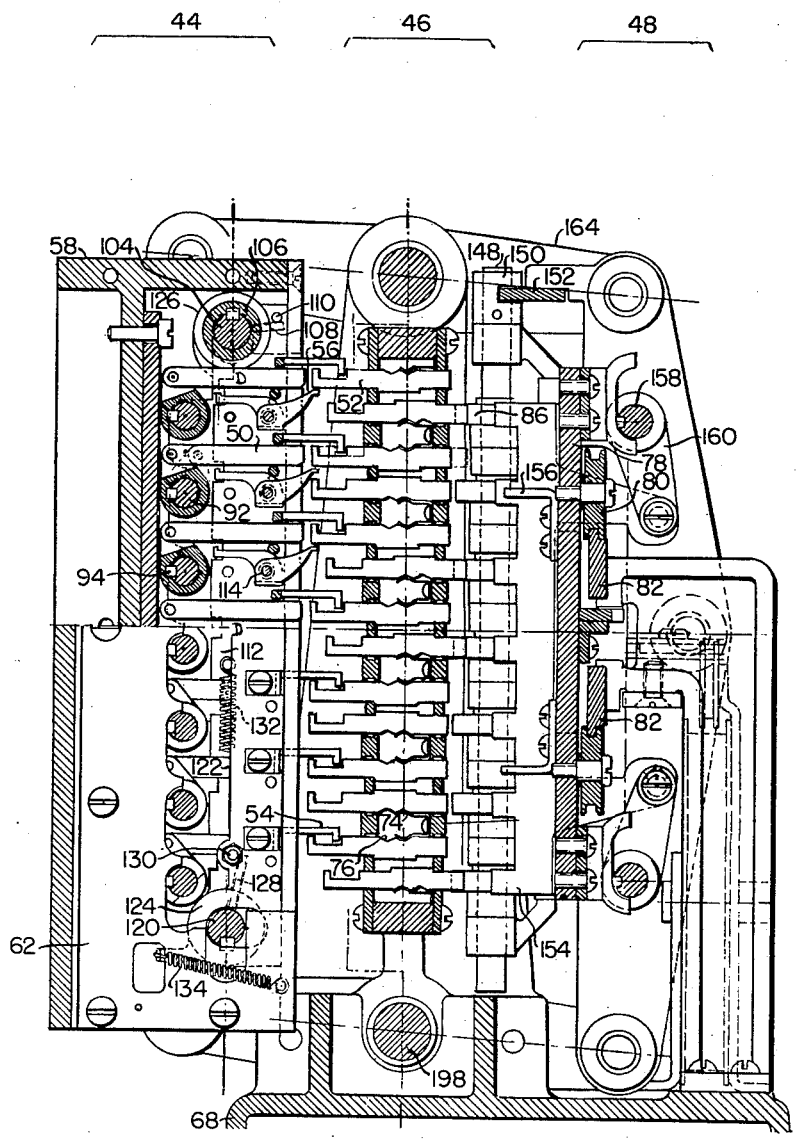
Figs. 7 and 8 are sectional elevations of the register.
Figure 9:
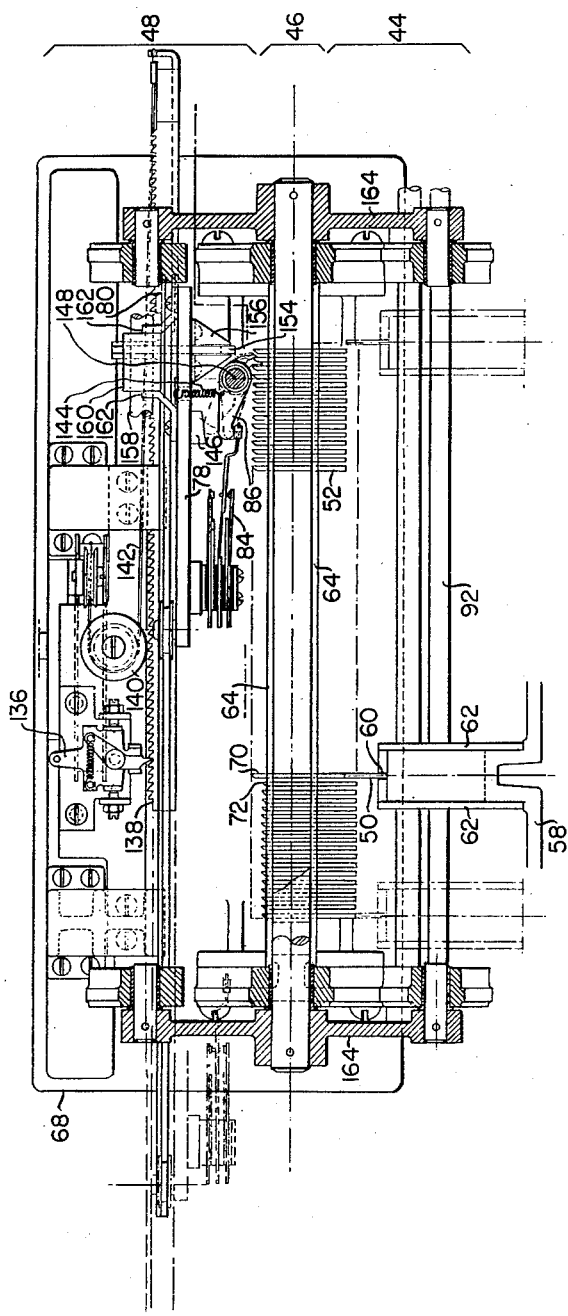
Fig. 9 is a top plan view of the register.

Subassembly 44 moves on one side of the fixed assembly 46 which comprises mainly two perforated plates 64, spaced by spacers 66 (Fig. 5) and secured to a frame 68. The plates 64 are provided with rectangular perforations in which are slidably mounted the flat pins 52. Each of these sliding pins may occupy selectively one of two positions, an operating position at 70 and an idle position at 72 (Fig. 9). When the operator begins to type a new line all the pins of the rows opposite the hammers are in the idle position and a combination of pins is pushed into operating position, in the same time the corresponding character is printed on the typewriter platen. each pin is securely maintained in one of these two positions by a spring 74 engaging a notch 76 in one side of the pin (Fig. 7).

The pins are arranged in horizontal rows, each row comprising as many pins as there may be characters in the longest line. The pitch or distance separating the axes of two consecutive pins is equal to the typewriter pitch. In the embodiment shown fourteen horizontal rows are provided, seven rows cooperating with assembly 44, while the seven other rows, on which the preceding line has been stored, cooperate with the assembly 48. This last assembly comprises a scanning carriage formed of a plate 78 provided with grooved rollers 80 travelling on the edges of fixed bars 82 and bearing seven make-and-break contacts 84, actuated by the seven feelers 86 displaced along the assembly 46 by said scanning carriage. This latter travels step by step and is controlled by the photographic unit; the length of each step is exactly the same as the pitch of the rows of pins.

In summary the register comprises two mobile sub-assemblies 44 and 48 which may move independently on each side of a fixed assembly 46. The first assembly is controlled by the typewriter, while assembly 48 is controlled by the photographic unit.

The different sub-assemblies will now be described in greater detail.

Assembly 44 bears seven hammers 50, each formed of a flat member pivotally connected to a rocking lever 88 (Fig. 5) by a pin 90. Each lever 88 is integral with a sleeve sliding freely along the shaft 92 but is compelled to rotate with the same shaft by means of a key 94 sliding in a keyway cut into the shaft, said feather or sliding key 94 being held between the two plates 62. These plates 62 are secured to member 58 so that they compel the levers 88 to follow all the displacements of the typewriter platen. The hammers are actuated individually and selectively by electromagnets such as 96 (Fig. 5) which are provided on one side of the frame and effective to rotate the shafts such as 92 when they are energized, through a convenient linkage 98 and a lever 100 keyed on the shaft 92. When they are rocked by the electromagnets selectively energized by the contacts operated by the permutation bars of the typewriter, these shafts 92 rock levers 88 whatever may be the position of these levers along the shafts and the corresponding hammers are pushed towards the frame 46, against spring 102. The hammers are subsequently advanced one step at the same time as the typewriter platen.

When a correction is needed the platen is first returned to place the character to be erased in the printing position of the typewriter. A key COK (Fig. 2) is then depressed which, as will be explained later, actuates the line counter backwards and brings all the pins opposite the hammers back to the rest position. This key subsequently energizes an electromagnet COC which rotates a shaft 104 in counterclockwise direction. This shaft drives a sliding sleeve 106 by means of a key provided in the shaft. A projecting stud 108 screwed into said sleeve 106 pushes upwards a stud 110 together with the plate 112 in which it is fixed.

Figure 8:
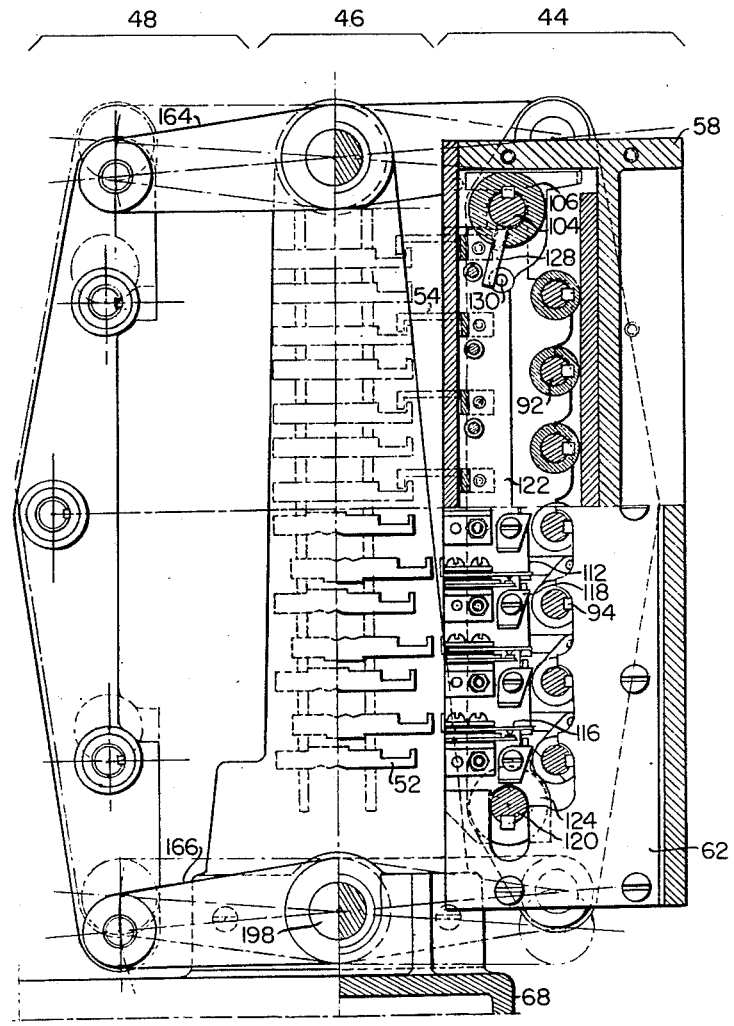

The plate 112 is provided with elongated holes through which passes shaft 104 and which enable said plate to slide vertically freely. This plate is limited to move only in its own plane by one of the guide plates 62 (Fig. 4) and the sliding sleeve 106. The plate 112 is provided with seven feelers 56, with two tails, loosely pivoted on the pins 114 (Fig. 7) mounted on the plate so that, when this plate is pushed upwards, all the feelers finding on their path a pin in the idle position will be rocked clockwise, and the tails 56 will open the associated correcting contacts 116 (Fig. 8). It appears that when the plate 112 is pushed upwards the correcting contacts corresponding to the depressed pins on the vertical row will not be actuated. These contacts represent the combination of the faulty character to be erased; and they are used as hereinafter described for actuating backwards the line counter by a number of units corresponding to the width of said faulty character. The feelers are maintained in their normal position against an abutment 118 by a spring or other similar means.

To erase an erroneous character the first rotation of the shaft 104 is followed by a second rotation clockwise under the control of an electromagnet EF (Fig. 2), and this rotation drives, through a linkage not shown, the lower shaft 120 which moves to the left a plate 122 (see Fig. 7). This plate 122 is moved in part by the same device which has been described above comprising two sliding sleeves 124 and 106 (Fig. 7) provided with studs 128 acting on studs 130 mounted on the plate. This latter plate bears seven hooks 54 adapted to engage notches in the sliding pins so that, when the plate is displaced towards the left in Fig. 7, these hooks will find in their way the depressed pins of the vertical row corresponding to the character to be erased. They will therefore return all these members to their idle position, so that a new combination may replace the erroneous one.

The plates 112 and 122 are returned to their rest position by springs 132 and 134 respectively (Fig. 7), and are held between the plates 62 and the sleeves 106 and 124, so that they follow all the movements of the plates.

The mobile assembly 44 actuates the odd pins while the even pins on which the preceding line has been registered cooperate with the assembly 48 as described above, and at the end of each line when the typewriter platen and the scanning carriage have returned to their initial positions, a rocking motion takes place so as to place the assembly 44 opposite the even pins, while assembly 48 is brought opposite the odd pins.

The scanning carriage is moved one step during each idle cycle of the character matrix drum or disk by actuating an escapement 136 (Fig. 9) cooperating with the rack 138 rigidly connected to the scanning carriage and constantly pulled by a spiral spring enclosed in a casing 140 acting on a cord 142 through deflecting rollers. A series of seven contacts 84 cooperate with the decoder and are mounted on the scanning carriage. They are actuated by feelers 86 each being provided with a tail portion which is rocked when it meets on its path a protruding pin, that is to say, a pin in operative position. The feeler is shown in Fig. 9 is opposite a pin in operative position and its associated contacts are therefore operated. The feeler has a tension spring 144 but this spring is not strong enough to reset the pin. When the feeler arrives opposite a pin in the idle position, it remains in its rest position shown in dotted lines under the action of the spring 144 pressing it against an abutment 146. The seven feelers may rock freely on a vertical rod 148 but are displaced with this rod when it slides axially in the bearing 150 of the scanning carriage, so that the feelers may be brought opposite one or the other row of pins. This displacement of the rod 148 is caused by a flat bar 152 (Fig. 7) engaging a notch formed in this rod, which is displaced alternatively upwards and downwards after the completion of a line. A resetting hammer 154 pushing all the pins at the same time into their initial position is adapted to act on the vertical row of pins which has been previously scanned by the feelers 86. This hammer is preferably made in the form of a flat piece guided in the comb 156 and displaced rapidly to the left as soon as the scanning carriage has moved one step. Shafts 158 (Figs. 7 and 9) control this resetting hammer, the latter being pivoted and supported by two levers 160 integral with sliding sleeves provided with keys so as to be rocked when the shafts rotate under the action of an electromagnet. Levers 160 are guided by the flat members 162 (Fig. 9) fixed on the scanning carriage, and compel the hammer to follow the movement of this carriage.

In order to be able to change easily and simultaneously the position of assemblies 44 and 48 at the end of each line, these assemblies, except the scanning carriage, are supported by the shafts on which they slide, said shafts being journaled on arms 164 and 166 which form a part of a rocking frame. The rocking movement must not occur before the typewriter platen and the scanning carriage are returned to their initial position beyond the last vertical row of pins, so that the opening 60 of the assembly 44 and the feelers of the assembly 48 can move freely up and down without meeting the pins in their path. The rocking movement is initiated mechanically and automatically by the platen of the typewriter and at the correct instant by the device shown in Figs. 6a and 6b. A lever 168 is pivoted on a fixed pin 170 and pressed by a spring 172 against a cam surface 174 fixed on the typewriter platen. A second lever 176 is pivoted at 178 on the lever 168 and provided with a roller 180. It is constantly urged into dotted position 182 by a centering device comprising a spring 184 cooperating with a stud 186 fixed on the lever 176 and the tail of the lever 168. A flat member 188, shaped like a wedge, is fixedly mounted on an arm 166 so that the tip of the wedge shaped part of the member 188 will lie in either of two positions according to the position of the arm 166.

Assuming that the different parts are positioned as shown in full lines in Fig. 6a at the end of a line, during the return travel of the platen, the cam surface 174 will meet the end of the lever 168 on its path and this lever will rock clockwise against the spring 172 until it reaches the dotted position 190. The second lever 176 is then liberated from the action of the inclined edge of the wedge shaped member 188 and returns to its initial position 182 with its associated roller which goes into position 192.

When the platen, continuing its travel, carries the cam surface beyond the point 194, the lever 168 will be suddenly rocked counterclockwise by the spring 172 and the roller passes from the position 192 to dotted position 196 under the action of the cam surface of one side of the member 188. This member will be rotated clockwise around the shaft 198 and with it the arm 166 which will pass from the position shown in full lines to that shown in dotted lines at 200. When, during its return displacement, the member 174 finds the lever 168 on its path, this member rocks over and clear of the lever, since the member 174 is pivoted on a pin 202, and is returned to its initial position by a spring, not shown.

Descriptions of this same registering apparatus are also to be found in our said applications Serial Nos. 770,320 and 187,476.

*Line counter*

It has previously been explained how the key bars of the typewriter operate a set of permutation bars and close their associated contacts according to the code combinations allocated to the various characters. We shall only consider here the first four contacts which characterize the character widths. The corresponding four contacts are connected to the four entries of the binary counter. It is clear that these four entries must be adapted to operate simultaneously since the permutation bar contacts are simultaneously operated. The result of the addition of these various numbers in the counter is recorded in binary or accumulating relays, or combinations of relays. These relays are such that they have two stable positions, and they move from one position to the other when current is applied and interrupted, and then remain in this latter position. For this reason they may be called "flip-flops."

Figure 3:
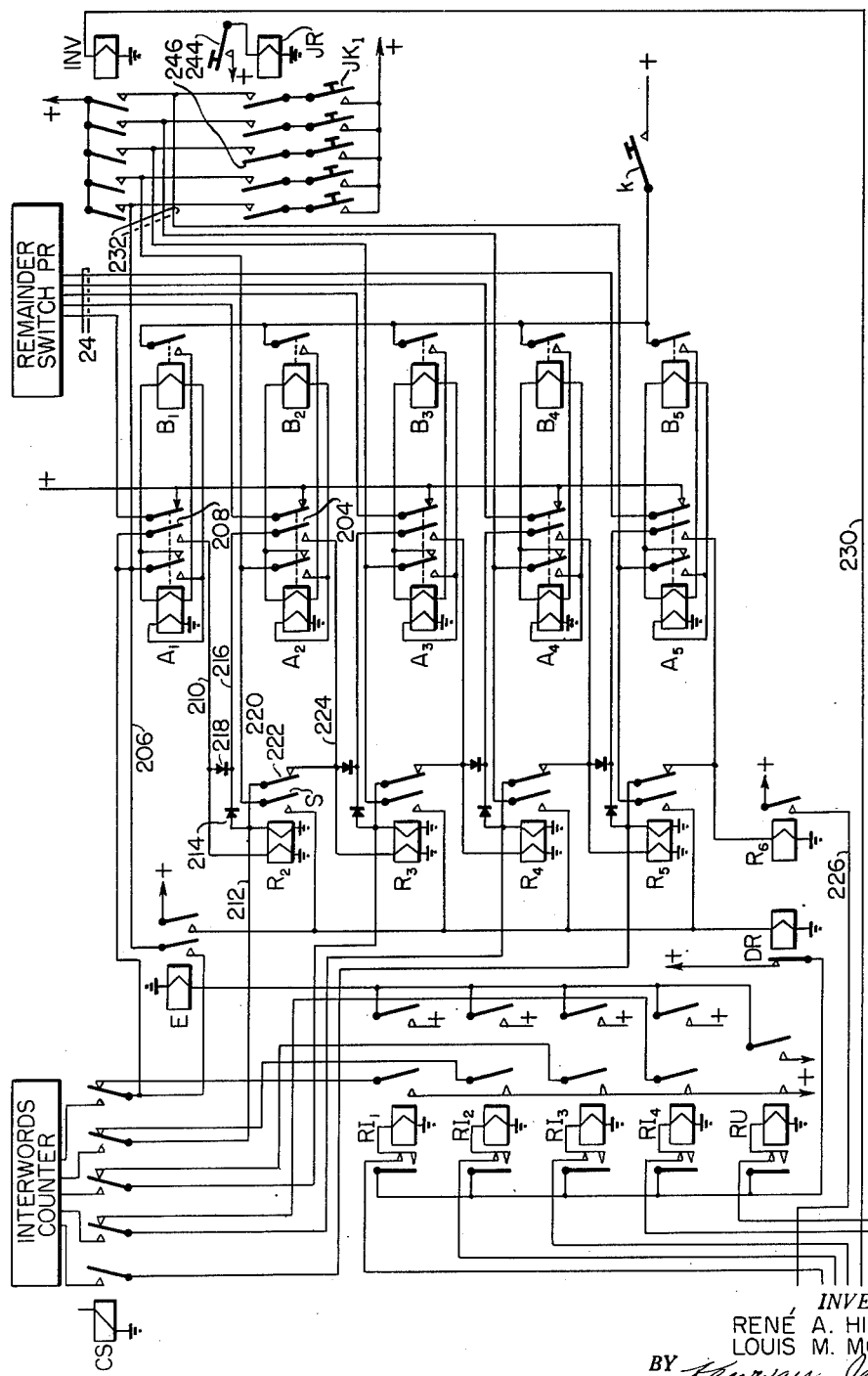

Figure 3 shows a counter haxing five flip-flop circuits each of which uses ordinary telephone relays such as A2 and B2. Assuming that a key $k$ is closed, when the battery is connected through contacts S of a particular stage, current flows through relay B2 and the left-hand winding of relay A2 in series, but the single winding of A2 is too weak to operate A2. (The term "operate" is used herein to refer to an attraction of the armature.) Hence relay B2 alone operates. When the switch S is opened the second winding of A2, which during the impulse was connected to battery on both sides is now excited, and both windings of A2 and the winding of relay B2 remain energized. Both armatures are attracted. When the switch closes a second time relay B2 has both terminals connected to battery and releases, but A2 remains operated by its right-hand winding. This is a well-known type of double-winding relay in which one winding is unable to operate the relay but is able to maintain it in the operated condition.) When the switch is opened A2 releases and the cycle can repeat. Contacts 204 controlled by relay A2 are adapted for connection in an external circuit. These contacts close for every two actuations of switch S.

If we consider now the binary relay of a given stage it is clear that it must operate when one impulse is applied to it, and that it must carry over this same impulse to the higher order if it is already in its operated or "one" position, and that it must not transmit a carry impulse if it is in its "zero" position. However, if a stage receives both a carry-over impulse from the lower order and a direct impulse it must not operate, but must carry over a single impulse to the next higher order, whatever its own initial position may be.

Figure 3 also shows an example of an embodiment of a binary counter which fulfils these requirements. It comprises as many flip-flop relay circuits as there are stages, or five in the example shown. Each flip-flop circuit is provided with contacts such as 204 which are closed when the flip-flop circuit is in position "1" and open when it is in position "0." Such simple make contacts on the flip-flop circuits would be sufficient if the entries on the various stages were not simultaneous, but occurred in succession.

When a flip-flop circuit receives a carry-over potential from the preceding stage and an operating potential from its own stage it is not convenient to operate this flip-flop circuit twice. A more rapid and convenient arrangement is such that a flip-flop circuit of a stage in which a double entry occurs is prevented from operating at all, but it sends the next higher stage a carry-over potential. The circuit shown in Fig. 3 fulfills these conditions. All stages are identical except the first one which, of course, cannot receiver any carry-over potential. Each stage is provided with a carry-over relay R2, R3, etc. These relays have two windings in opposition relation and operate whenever one winding is energized and remain at rest when both windings are energized. The input to the first stage is through a lead 206, said lead being connected directly to the flip-flop circuit and also to contacts 208. A carry-over lead 210 runs from contacts 208 of this stage to one winding of R2. The input lead 212 of the second stage runs to the second winding of R2 and also through a rectifier 214 and lead 216 to contacts 204 (but not to the flip-flop circuit A2, B2 itself). A second rectifier 218 is connected between leads 210 and 216.

The relay R2 has make contacts S connected by a lead 220 with the flip-flop A2, B2, and break contacts 222 connected with the input lead 212 of its own stage and with a carry-over lead 224 running from contacts 204 of flip-flop A2, B2 to one winding of R3.

The third and subsequent stages are simply a repetition of the second stage.

Figure 4:
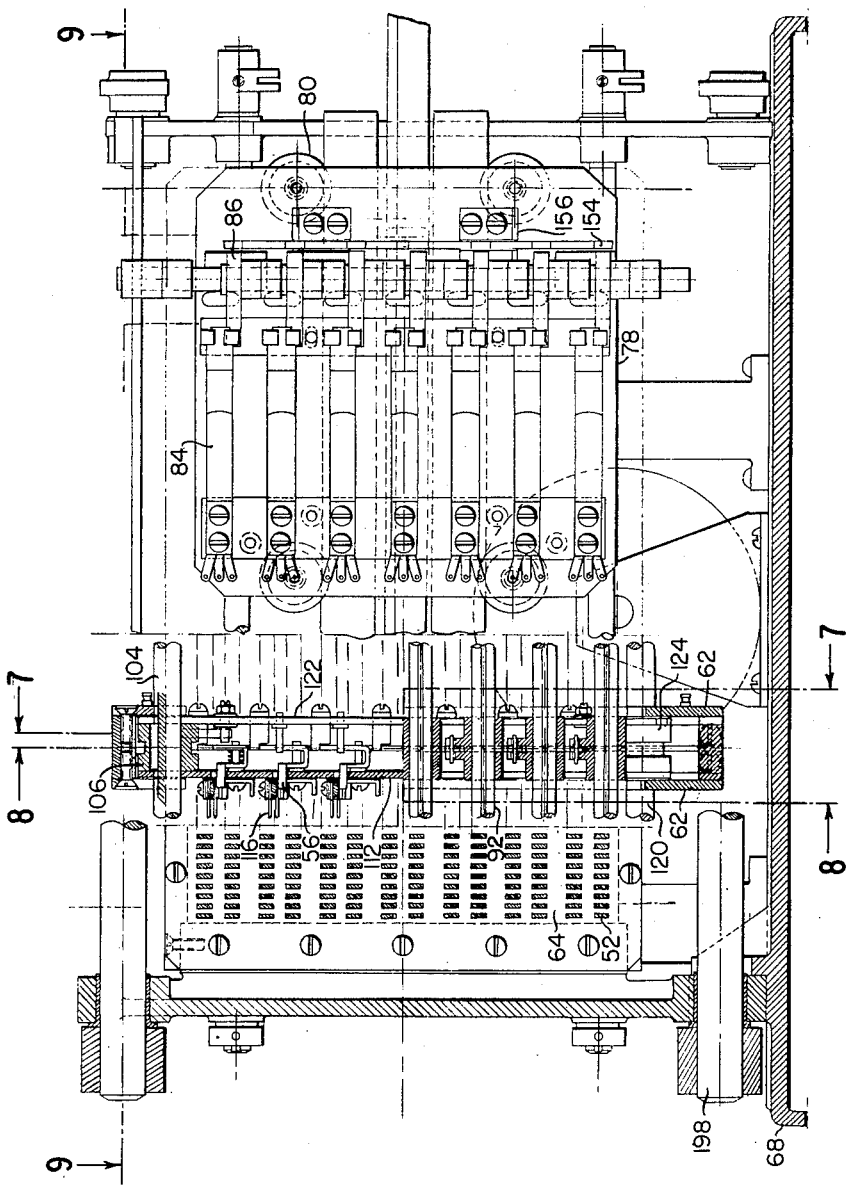
Fig. 4 is a front elevation of the register, partly in section.

It will be observed that the counter of Fig. 4 has the advantage that a carry-over impulse is transmitted through all necessary stages without requiring successive operations of the relays. For example, if the first three flip-flop stages are all in their 1-positions (corresponding to 111 in the binary system or 7 in the decimal system), energization of the lead 206 sends a carry-over impulse directly through contacts 208 of the first stage, rectifier 218, lead 216, contacts 204 and lead 224 of the second stage, and through exactly similar connections of the third stage, directly to the fourth stage. Also the flip-flop relays of the first three stages convert to the "0" condition in unison. The relay E is not operated to allow the flip-flops to operate until after the carry-over relays have assumed their correct positions. The ultimate result in this example is to record 1000, the sum of 111 and 1 in the binary system.

As a practical measure which will be explained later, relay E is introduced with contacts in the ground leads of the flip-flop relays. At this time it will be assumed that relay E is energized and its contacts are hence closed.

Let us consider the second stage, for instance. When a single entry is made, either from stage A1, B1 through the closed contacts 208, or by a control potential applied to lead 212, relay R2 operates since one of its windings only is energized. By its make contact S it operates flip-flop circuit A2, B2. If flip-flop circuit A2, B2 is on position "1" this operating potential is also transferred to relay R3 of the following stage and so on.

If, on the contrary, there are two simultaneous entries, one carry-over from the first stage through lead 206 and the contacts 208 of flip-flop circuit A1, B1 (in its closed or "1" position) and lead 212 of the second stage, relay R2 does not operate since both its windings are energized and the operating potential is transferred by the break contact of relay R2 at rest to relay R3 of the following stage.

*Line storage*

Figure 2:
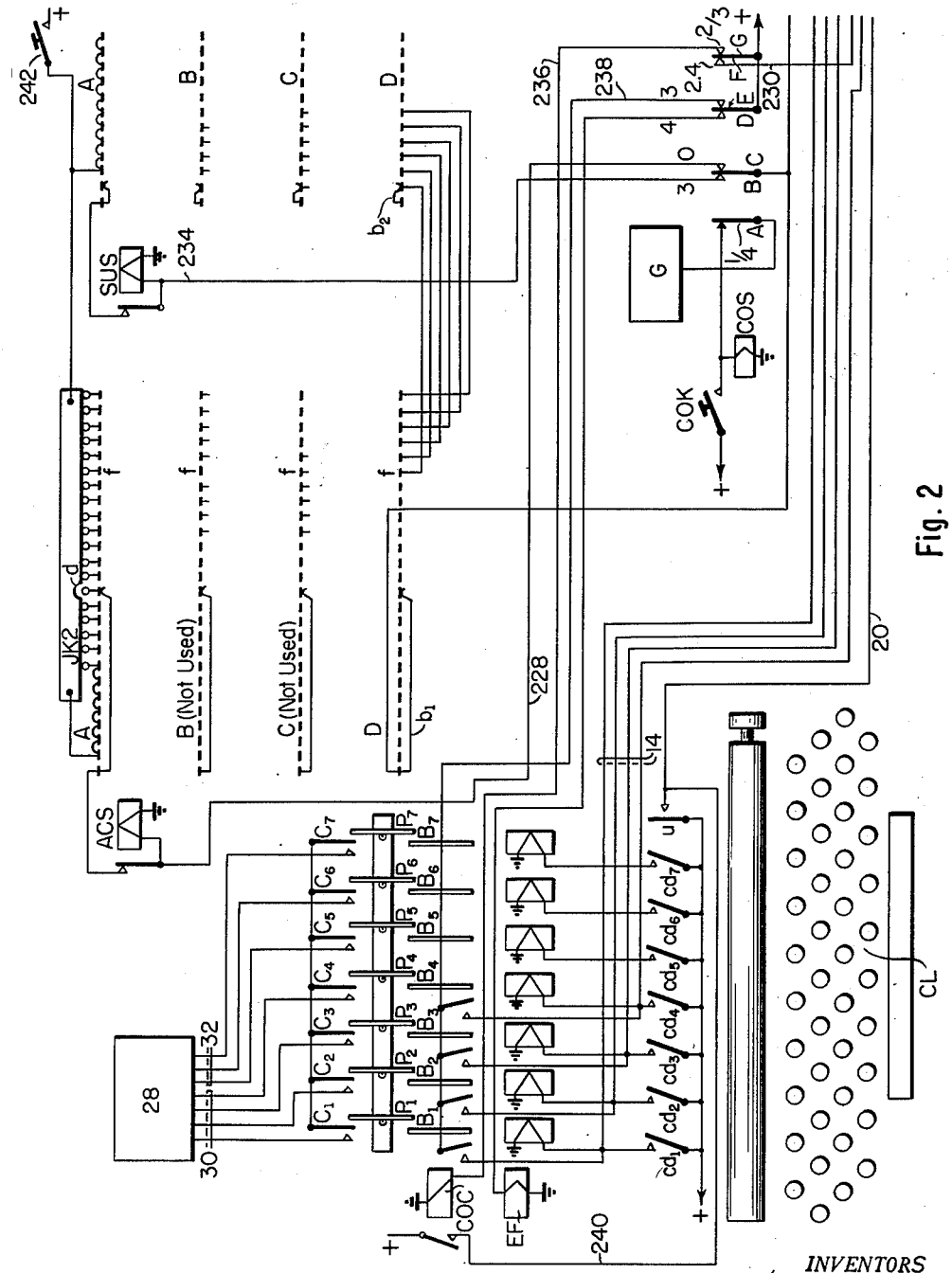
Figs. 2 and 3 are circuit diagrams of the accumulator and of the keyboard and correction controls.

The operation of the machine during storage of a line will be described in relation to the detailed diagram shown in Figs. 2 and 3, and is the same as that which is more fully described in our said application Serial No. 70,472. The typewriter is shown in the lower left-hand corner of Fig. 2. When the operator depresses one key he operates a number of the permutation bars (as described in our copending application Serial No. 770,320) and closes the corresponding associated contacts $cd1$, $cd2$, $cd3$, $cd4$, which characterize the character width and contacts $cd5$, $cd6$ and $cd7$ which differentiate characters of the same width. Since the permutation bar contacts may be closed for slightly different lengths of time intermediate relays RI–1, RI–2, RI–3 and RI–4 (Fig. 3) are introduced between the permutation bar contacts and the counter. These relays are operated through leads 14 (see also Fig. 1) by the permutation bar contacts $cd$ and lock themselves by holding circuits established through their make-before-break contacts and a now-closed break contact of a special delay relay DR. In this way it is possible to maintain these relays operated for an appropriate length of time whatever the duration of closure of the permutation bar contacts. The intermediate relays, when operated, apply a battery to the counter input leads through a switching relay CS which during the storage of the line is at rest. Four counter stages are sufficient to take care of the character widths but it is desirable to provide an additional counter stage in order to take care of more than 15 interwords, since as previously noted, the number N of interwords is fed into the line counter through the leads 23. Whenever any key of the typewriter keyboard CL is depressed a contact $u$, called the universal contact, is operated. This contact operates a relay RU which also locks itself on the break contact of relay DR. Also, the relay E is operated by make contacts of relays RI–1 to RI–4 and RU in parallel. The object of this relay E, as previously explained, is to delay the application of the battery to the binary relays and thus give to the carry over relays R2 to R6 the time to operate and prepare the circuit.

When the five-stage binary counter reaches its capacity an impulse is sent to the stepping switch ACS (accumulating switch) which advances one step. Switch ACS is a stepping switch (Fig. 2) which advances one step for each 32 units counted on the binary counter. It may be viewed as a scale-of-32 counter which has a capacity sufficient to store the total number of units in the line. The impulse is transmitted as follows: When the binary counter exceeds its capacity a circuit is completed through the carry-over relay R6 in the same way that carry-overs are effected at any stage of the counter itself, as previously explained. When R6 closes its contacts it transmits a pulse over a lead 226, a contact of switch COS to be later described and a lead 228 to ACS. Energization of the winding followed by deenergization after R6 opens causes a one-step advance of the contacts of ACS.

For the stepping switches ACS and SUS (Fig. 2), the actual step contacts are shown. For the switch COS, however, a simplified drawing is used, and the contacts are designated by a standard convention. The various "levels" of the switches are designated by capital letters without subscripts, A, B, C, etc. Thus the correction switch COS (Fig. 2) has seven levels designated A to G. The contacts of the various levels are designated.

| | |
|---|---|
| A | 1/4 |
| B | 3 |
| C | 0 |
| D | 4 |
| E | 3 |
| F | 2.4 |
| G | 2/3 |

Each number represents a closed contact. The mark / means that all contacts between the two numbers are closed, while the dot means that all contacts between the two numbers are open. Thus level A is open on its home position 0 but is closed on all steps from 1 through 4. Level B is closed on step 3 only, C on position 0 only, D on 4, E on 3, F on 2 and 4 (but open on step 3) and G on 2 and 3.

Correction procedure

The procedure of making a correction will next be explained. If the operator sees that he has made an error, it is necessary to erase the wrong character from the register and also to subtract its width value from the line counter, before introducing the correct character. The operator merely resets the typewriter platen back to the wrong character and then presses the correction key COK. This energizes the stepping switch designated COS (correction switch). The subtraction is effected by inverting the binary counter (i. e. changing all 1's to 0, and all 0's to 1), adding the number to be subtracted, and then re-inverting the binary counter. This is the mathematical process of subtracting by adding complements; for example to subtract 11 from 1000 in the binary system, invert 1000 to obtain 0111, add 11 to obtain 1010, and reinvert to obtain the results 0101. This latter procedure is carried out by COS, which, when COK falls back, is connected by its level A to an impulse generator G. Switch COS moves therefore 4 steps until it reaches its fifth position which is also its starting position and in which its connection with the impulse source is interrupted. During its rotation this switch controls the following operations: first it disconnects the winding of ACS from the make contact of R6 by its level C–0 (note that the C level provides a closed contact only on position 0). On step 2 by its level F switch COS sends an impulse over lead 230 to relay INV (inversion relay). The inversion relay closes its contacts and sends an impulse over each of leads 232 to all of the relays A1 to A5 and B1 to B5 of the binary counter. From the description of the counter previously given, it will be seen that this will invert each binary stage, that is, it will change a "0" position, whereever it exists to a "1" position, and will change a "1," whereever it exists, to a "0."

On step 3 level B of COS connects the SUS stepping switch (subtraction switch) to the make contact of relay R6 by leads 226 and 234. In other words it has disconnected ACS from this carry-over relay R6 and has connected SUS in its place for a reason to be explained below. On both steps 2 and 3 COS operates by its level G and wire 236 the sensing magnet COC which detects the position of the first four pins of the register to determine the width of the faulty character as previously explained. In position 3, by its level E, COS sends an impulse through lead 238 to the contacts of the COC magnet which are closed by the register pins corresponding to the erroneous character. The contacts of the COC magnet are in parallel with contacts cd1 to cd4 of the keyboard. Hence leads 14 carry to the intermediate relays RI–1 to RI–4 and RU the same values that were transmitted when the erroneous character was set up. The impulse to relay RU is actually provided by means of an auxiliary make contact on COC and wire 240.

If a carry-over occurs at this stage of the correction process it must be subtracted from the accumulating switch ACS since, if a carry-over occurs in the subtraction of an erroneous width, it is necessarily because a carry-over also occurred when the erroneous character was typed. To come back to the correct position it would be necessary to step ACS one step back. Since the usual stepping switches are not adapted to move backwards the auxiliary stepping switch SUS has been provided. This stepping switch receives any carry-over which may occur during the subtraction process and moves one step backwards the "end of line" terminal of ACS. In Fig. 2 it may be seen that ACS gives a signal on a brush b2 that the capacity of the counter has been reached, or exceeded, when its brush B1 of level D reaches terminal f. This signal is used in the justification; its connection with the justifier is not shown in the drawings, but may be seen in our said copending application Serial No. 70,472. But if SUS has moved one step it may be seen that ACS will have to move one more step than normally. In position 4 COS by its level F sends another impulse to relay INV which reverses again the position of all binary relays. The width of the erroneous character has thus been subtracted from the counter. In position 4, by its level D, COC energizes electromagnet EF which, is previously explained, pushes back into their set position the register pins of the faulty character. At the end of the fourth impulse switch COS falls into its fifth position (which is also its zero position) where it is disconnected from the impulse source. The correction cycle is now completed and the operator can strike the correct character.

In connection with correction cycle described above, it will of course be recognized that in the event that a word space is erased the interword counter CI must be stepped back one step, or else an equivalent arrangement such as that described above for the switch ACS must be provided. This may be done conveniently through a circuit (not shown) connected with the leads 14 and arranged to provide a signal only when the leads corresponding to the code combination for a word space are energized by operation of the sensing magnet COC.

A detailed description of the justification procedure, which is initiated after the line has been correctly typed, is given in our said application Serial No. 70,472, and involves the apparatus herein described in combination with other switches, controls, and circuits not shown in the accompanying drawings or directly related to the present invention. It will suffice for present purposes to state that upon completion of the computation hereinbefore described, a circuit represented in Fig. 2 by a switch 242 connects battery to the "homing levels A" of the switches ACS and SUS. These are returned to their "home" positions in a well-known self-cycling manner.

The "home position" of the switch ACS is made variable according to the desired length of the justified line, by means of the justification bar JK2. In conjunction with the setting of this bar, the justification relay JR (Fig. 3) is operated by a circuit represented by a switch 244. This relay has five sets of contacts 246 in series with five manually operated keys JK1. The contacts 246 are connected to the inputs of the flip-circuits of the line counter by leads 232. If none of the keys JK1 are closed the counter remains empty. If any of the keys are closed, corresponding values are initially set into the line counter when the switch 244 is closed. This cuts down the available capacity of the counter by the values initially set in. For example, if the total capacity of the line counting apparatus (the counter 12 and ACS) is, say, 512, and it is desired to write a line of 504 units, 8 units will be set into the binary counter at the beginning of each line, if the fourth key JK1 is kept closed. If the line is to be reduced more than 31 units below capacity, the starting position of ACS is changed by sliding the bar JK2 (Fig. 2) which closes all but one contact "d" of the home-return level A of ACS.

A detailed description of the parts of the apparatus associated with the transcription of the characters in the register after completion of the justification computation is to be found in said application Serial No. 70,472 and is not here given.

It will be appreciated that, while the invention has been described above with reference to specific and preferred embodiments of the register, the counter and other associated circuits and parts, many variations in design, circuitry, arrangement, procedure and operation may be incorporated in accordance with conditions and requirements of use, all of which would be within the purview of one skilled in this art after a reading of this specification. It is understood and believed, therefore, that such variations would also fall within the spirit and scope of the present invention.

Having thus described the invention, we claim:

1. In type composing apparatus, the combination of a register having a number of memory elements for each selected character in a line of type, said elements including provision to represent the width of the character in numerical form, a typewriter having a keyboard and a spacing carriage movable relative to said elements, a selector movable with the carriage and selectively engageable with said elements under the control of the keyboard, a counter operated by the keyboard to add the widths of the selected characters in a line, correction means movable with the selector and operable upon the same elements in any position thereof, including sensing means to detect the width of a faulty character and erasing means to reset the elements corresponding thereto, and means controlled by the sensing means to subtract the width of said faulty character from the counter.

2. In type composing apparatus, the combination of a typewriter having a keyboard and a spacing carriage, a number of code elements actuated by the keyboard to represent consecutively the selected characters in a line of type and their widths in numerical form, a register having memory elements corresponding to the code elements for each of said characters, a selector movable with the carriage and selectively engageable with the memory elements under the control of the code elements, a counter operated by the code elements to add the widths of said characters, correction means movable with the selector and operable upon the same elements in any position thereof, including sensing means to detect the width of a faulty character and erasing means to reset the memory elements corresponding thereto, and means controlled by the sensing means to subtract the width of said faulty character from the counter.

3. In type composing apparatus, the combination of a typewriter having a keyboard and a spacing carriage, a number of code elements actuated by the keyboard to represent consecutively the selected characters in a line of type, said code elements being divided into a width selector group for representing a character width in numerical form and a character selector group for distinguishing between characters of like width, a register having memory elements corresponding to the code elements for each of said characters, a selector, movable with the carriage and selectively engageable with the memory elements under the control of the code elements, a counter operated by the code elements to add the widths of said characters, correction means movable with the selector and operable upon the same elements in any position thereof, including sensing means to detect the width of a faulty character and erasing means to reset the memory elements corresponding thereto, and means controlled by the sensing means to subtract the width of said faulty character from the counter.

4. In type composing apparatus, the combination of a register having a number of memory elements arranged in groups, one group for each character in a line, each group including a sub-group representing the character width in numerical form, a typewriting machine having a platen carriage movable relative to the memory elements, a selector movable with the carriage and selectively engageable with the memory elements, computing means to add the widths of characters in a line, sensing means operable with said sub-group of memory elements corresponding to a typed faulty character to detect the width of said character, erasing means operable to reset the memory elements corresponding to said characters, and means controlled by the sensing means for operating the computing means to subtract the width of said character.

5. In type composing apparatus, the combination of a typewriter having a keyboard and a spacing carriage, a register having a number of memory elements for each selected character in a line of type, said elements including provision to represent the width of the character in numerical form, an assembly engaged with the carriage and adapted to be moved thereby relative to said elements, said assembly having a selector engageable with selected combinations of the elements under the control of the keyboard, sensing means operable in conjunction with said elements to detect the width of a faulty character, and erasing means to reset the elements corresponding thereto, a counter operated by the keyboard to add the widths of the selected characters in a line, and means controlled by the sensing means to subtract the width of said faulty character from the counter.

6. In type composing apparatus, the combination of a typewriter having a keyboard and a spacing carriage, a register having a number of memory elements for each selected character in a line of type, said elements including provision to represent the width of the character in binary form, an assembly engaged with the carriage and adapted to be moved thereby relative to said elements, said assembly having a selector engageable with selected combinations of the elements under the control of the keyboard, sensing means operable in conjunction with said elements to detect the width of a faulty character, and erasing means to reset the elements corresponding thereto, a binary counter operated by the keyboard to add the widths of the selected characters in a line, means to invert the counter preparatory to making a correction of said faulty character, means controlled by the sensing means to add the width of said faulty character to the inverted counter, and means to reinvert the counter.

7. In type composition, the method of storing in a register information corresponding to selected variable-width characters for subsequent transcription in a line, which consists in the steps of advancing a carriage provided with selector, sensing and erasing means into operative relation with consecutive positions of the register, actuating the selector means to store in each position information corresponding to a selected character including its width, accumulating the widths as they are successively stored by the selector means, returning the carriage to operative relation with any single position representing an erroneously stored character, actuating the sensing means to sense the width of said erroneously stored character, subtracting the sensed width from the previously accumulated total of selected character widths, and actuating the erasing means to erase the information corresponding to said erroneously stored character.

References Cited in the file of this patent

UNITED STATES PATENTS

| | | |
|---|---|---|
| 626,098 | Risley et al. | May 30, 1899 |
| 2,392,224 | Bryce | Jan. 1, 1946 |
| 2,398,457 | Wallach | Apr. 16, 1946 |